US011002387B2

(12) United States Patent
Choi et al.

(10) Patent No.: US 11,002,387 B2
(45) Date of Patent: May 11, 2021

(54) BRAKE HOSE

(71) Applicant: HS R & A Co., Ltd., Gyeongsangnam-do (KR)

(72) Inventors: Jae Hyeok Choi, Gyeongsangnam-do (KR); Deok Hyun Lim, Gyeongsangnam-do (KR); Kwon Sik Hwang, Gyeongsangnam-do (KR)

(73) Assignee: HS R & A Co., Ltd., Gyeongsangnam-do (KR)

( * ) Notice: Subject to any disclaimer, the term of this patent is extended or adjusted under 35 U.S.C. 154(b) by 181 days.

(21) Appl. No.: 16/380,435

(22) Filed: Apr. 10, 2019

(65) Prior Publication Data

US 2019/0323635 A1 Oct. 24, 2019

(30) Foreign Application Priority Data

Apr. 19, 2018 (KR) .................. 10-2018-0045462

(51) Int. Cl.
*F16L 11/10* (2006.01)
*F16L 11/02* (2006.01)
(Continued)

(52) U.S. Cl.
CPC ............. *F16L 11/10* (2013.01); *B32B 1/08* (2013.01); *B32B 25/10* (2013.01); *B32B 25/18* (2013.01);
(Continued)

(58) Field of Classification Search
CPC ........... F16L 11/10; F16L 11/02; B60T 17/04; B32B 25/10; B32B 25/18; B32B 1/08; B32B 2597/00; B32B 2262/0284
See application file for complete search history.

(56) References Cited

U.S. PATENT DOCUMENTS

2004/0170791 A1* 9/2004 Yanadori ................ B32B 25/10
428/36.91
2006/0182914 A1 8/2006 Yasumatsu et al.
(Continued)

FOREIGN PATENT DOCUMENTS

CN 1771408 A 5/2006
CN 1840950 A 10/2006
(Continued)

OTHER PUBLICATIONS

Office Action in Korean Application No. 10-2018-0045462 dated Aug. 19, 2019, 5 pages.
(Continued)

*Primary Examiner* — Michael C Miggins
(74) *Attorney, Agent, or Firm* — Devlin Law Firm LLC; James M. Lennon

(57) ABSTRACT

A brake hose comprising according to the disclosure may include: a tube-shaped inner rubber layer filled with a brake fluid; and a first reinforcing fiber layer, an intermediate rubber layer, a second reinforcing layer, and an outer rubber layer, which sequentially surround an outer circumferential surface of the inner rubber layer, wherein the first reinforcing fiber layer has a structure in which a plurality of layers of butyl rubber, which is a material having a high loss factor, are stacked on a PET fiber to improve vibration insulating performance, and various exemplary embodiments may be possible.

5 Claims, 3 Drawing Sheets

(51) Int. Cl.
   *B60T 17/04* (2006.01)
   *B32B 25/10* (2006.01)
   *B32B 25/18* (2006.01)
   *B32B 1/08* (2006.01)

(52) U.S. Cl.
   CPC ............... *B60T 17/04* (2013.01); *F16L 11/02* (2013.01); *B32B 2262/0284* (2013.01); *B32B 2597/00* (2013.01)

(56) References Cited

U.S. PATENT DOCUMENTS

| | | |
|---|---|---|
| 2006/0223399 A1 | 10/2006 | Kurimoto et al. |
| 2014/0329035 A1 | 11/2014 | Tsunenishi |
| 2015/0247032 A1 | 9/2015 | Takatani et al. |

FOREIGN PATENT DOCUMENTS

| | | |
|---|---|---|
| CN | 101067466 A | 11/2007 |
| CN | 101469084 A | 7/2009 |
| CN | 202182263 U | 4/2012 |
| CN | 103946300 A | 7/2014 |
| CN | 104619768 A | 5/2015 |
| CN | 201535398 U | 8/2015 |

OTHER PUBLICATIONS

"Concise Handbook of Raw Materials and Equipment for the Rubber Industry 2016 Edition", Compilation and Review Committee of Consise Handbooks of Raw Materials and Equipment for the Rubber Industry, p. 55, Beijing University of Technology Press, Nov. 30, 2016.

Office Action for Chinese Patent Application No. 201910267060.2, dated Jul. 17, 2020.

* cited by examiner

BRAKE HOSE

CROSS-REFERENCE TO RELATED APPLICATION(S)

This application is based on and claims priority under 35 U.S.C. 119 to Korean Patent Application No. 10-2018-0045462, filed on Apr. 19, 2018, in the Korean Intellectual Property Office, the disclosures of which are herein incorporated by reference in their entireties.

BACKGROUND

1) Field

The disclosure relates to a brake hose.

More specifically, the disclosure relates to a brake hose having a vibration and noise insulting performance by including a first reinforcing fiber layer having a stacked structure of PET and a plurality of layers of butyl rubber.

2) Description of Related Art

The above information is presented as background information only to assist with an understanding of the disclosure. No determination has been made, and no assertion is made, as to whether any of the above might be applicable as prior art with regard to the disclosure.

As well known, a brake hose, which is one of the components constituting an automobile brake system, is a pipe configured to transmit hydraulic pressure between a chassis and a wheel and is designated as an important security part. As can be seen from above, the brake hose is a very important part to secure car safety.

Since such a brake hose is used in harsh environments for a long time, the requirement characteristics of the brake hose are variously and strictly regulated. Especially, expansion resistance for sensitizing hydraulic transmission of a brake fluid, fatigue resistance to vibration or bending, and corrosion resistance to a brake fluid are particularly important characteristics. These characteristics depend on a first reinforcing fiber layer, a second reinforcing fiber layer, rubber layers surrounding the first and second reinforcing fiber layers, adhesive strength between the first and second reinforcing fiber layers and the rubber layers, and the like. Especially, expansion resistance of the brake hose is associated with the first reinforcing fiber layer.

The first reinforcing fiber layer is formed by a knitting method mainly using a polyvinyl alcohol (PVA) fiber and a polyethylene terephthalate (PET) fiber. The PVA fiber is known as a material of imparting excellent expansion resistance, and the PET fiber is known as a material having excellent expansion resistance, fatigue resistance, and corrosion resistance to a brake fluid at a high temperature compared with the PVA fiber.

However, a brake hose employing these fibers for the first reinforcing fiber layer fails to show satisfactory performance in terms of expansion resistance and solution resistance. For example, when a PVA fiber known to show excellent expansion resistance is used, the expansion resistance of the brake hose is excellent at room temperature, but the expansion resistance of the brake hose deteriorates at a high temperature, which is caused by a temperature rise of the brake fluid, occurring when the number of times of braking increases due to the long-term driving of an automobile, and as a result, the braking performance is degraded.

When a PET fiber is used, the expansion resistance of a brake hose is excellent at a high temperature, which is caused by a temperature rise of the brake fluid, but the expansion resistance of the brake hose deteriorates at room temperature, resulting in a long braking distance.

With the recent speedup of vehicles together with advances in engine technology and improvement in road environments, the awareness of safety has increased, leading to a growing interest in the performance of brakes, and the performance of the brakes is required to meet stringent standards.

For example, the number of vehicles equipped with an electronic stability program (ESP) as a safety device configured to prevent slippage on a rainy road and an ice road by automatically controlling the output of an engine or independently controlling respective wheels in an emergency is rapidly increasing.

Therefore, a brake hose using, instead of the above-described fibers, a polyethylene naphthalate (PEN) fiber in a first reinforcing fiber layer has been recently proposed, and such a brake hose shows excellent performance in terms of fatigue resistance, expansion resistance, and corrosion resistance to a brake fluid, and thus has been considered as a next generation brake hose.

The use of the PEN fiber has advantages of slightly compensating disadvantages of the PVA and PET fibers, but has a disadvantage in that the PEN fiber cannot exhibit sufficient performance in terms of fatigue resistance and expansion resistance when repetition and bending are applied to a brake hose with the internal pressure applied.

A plurality of prior patent documents regarding brake hoses are disclosed as described above, and Korean Patent Registration No. 10-0709286 (12 Apr. 2007) (KR 10-0709286) and Korean Patent Publication No. 10-2015-0035423 (6 Apr. 2015) (KR 10-2015-0035423) are especially associated with brake hoses.

KR 10-0709286 provided a brake hose capable of implementing all of fatigue resistance, corrosion resistance, and expansion resistance at high levels by forming a first reinforcing fiber layer of a polyethylene-2,6-naphthlate fiber.

The brake hose of KR 10-2015-0035423 is characterized in that a reinforcing member disposed between rubber layers or on a rubber layer includes a polyethylene terephthalate dip cord that is applied with an initial load of 0.01 g/d to be fixed after being subjected to heat treatment for 15 minutes under a tension of 0.01 g/d at 180° C. and has a creep rate of 7.0% or less when being left for 24 hours while being applied with a load of 0.791 g/d at 100° C., the creep rate being defined by the following equation:

$$\text{Creep rate} = (L-L0)/L0 \times 100$$

In the above equation, L represents a length of the dip cord after being left for 24 hours, and $L_0$ represents a length of the dip cord when the reinforcing member is applied with the initial load to be fixed. The calculated creep rate indicates excellent shape stability, high modulus, and a low deterioration width in modulus at a high temperature.

Recent automotive technologies have been developed into miniaturization (lightweight) of automobiles and high-output of power trains according to the trend of high performance and low fuel consumption. As a result, the engine vibration of vehicles has increased by about 10% or more compared with previous generation of vehicles, and the lightweight automobile structures are inevitably vulnerable to vibration and noise transmission. In order to solve these problems, the noise, vibration, and harshness (NVH) performance of brake hoses is improved, which is an effective solid transmission sound blocking method, and therefore, vibration insulating performance besides long-term durability and ease of installation, which are requirement characteristics for existing brake hoses, is emerging as very important performance.

However, the brake hoses disclosed in KR 10-0709286 and KR 10-2015-0035423 do not disclose the improvement of vibration insulating performance thereof, and thus, such brake hoses are inconsistent with the demands of the times with respect to vibration insulating performance, which is currently emerging as very important performance.

SUMMARY

An aspect of the disclosure is to provide a novel brake hose having vibration and noise insulating performance while sufficiently satisfying excellent expansion resistance, fatigue resistance, and corrosion resistance.

In accordance with an aspect of the disclosure, a brake hose includes: a tube-shaped inner rubber layer filled with a brake fluid; and a first reinforcing fiber layer, an intermediate rubber layer, a second reinforcing layer, and an outer rubber layer, which sequentially surround an outer circumferential surface of the inner rubber layer, wherein the first reinforcing fiber layer has a structure in which a plurality of layers of butyl rubber, which is a material having a high loss factor, are stacked on a PET fiber to improve vibration insulating performance.

The PET fiber may be a polyethylene-2,6-naphthalate fiber.

The butyl rubber may be a halogenated butyl rubber, and the butyl rubber may be embedded inside the PET fiber, or the butyl rubber may be attached either or both above or below the PET fiber, or the butyl rubber may be stacked above, inside, and below the PTE fiber.

The halogenated butyl rubber may have a structure of:

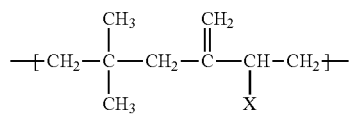

X = Cl, Br wherein a compound of the halogenated butyl rubber contains a base polymer, a reinforcing agent (carbon black), a plasticizer, and a cross-linking agent.

The content of the base polymer may increase by 10 wt % on the basis of an existing content thereof, and in order to lower the hardness of the butyl rubber and increase the loss factor of the butyl rubber, the carbon black reinforcing agent may employ FEF (size: 50 nm)/SRF (size: 70 nm) type carbon blacks mixed at a ratio of 1:1.

Through technical solutions of the technical problems, the disclosure provides the following effects.

A single-layered fiber of polyethylene terephthalate as a conventional first reinforcing fiber layer has excellent corrosion resistance compared with a polyvinyl alcohol fiber and a rayon fiber, but has a disadvantage in terms of expansion resistance (amount of volume expansion), which is one of the important characteristics of a brake hose, due to a small modulus of elasticity thereof as a fiber. However, the brake hoses according to various embodiments sufficiently satisfy excellent expansion resistance, fatigue resistance, and corrosion resistance while having improved vibration and noise insulating performance by allowing a first reinforcing fiber layer to have a stacked structure of PET and a plurality of layers of butyl rubber to increase the softening and loss factor of the compounded rubber.

Furthermore, the brake hoses according to various embodiments can be produced without separate equipment investment since the first reinforcing fiber layer can be formed in a stacked structure of PET and a plurality of layers of butyl rubber even using only current production equipment, thereby reducing manufacturing costs.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Hereinafter, preferable embodiments will be described with reference to the accompanying drawings. It should be understood that the same reference numbers are used throughout the drawings to refer to the same parts. Detailed description of well-known functions and structures incorporated herein may be omitted to avoid obscuring the subject matter of the disclosure.

Figure 1:
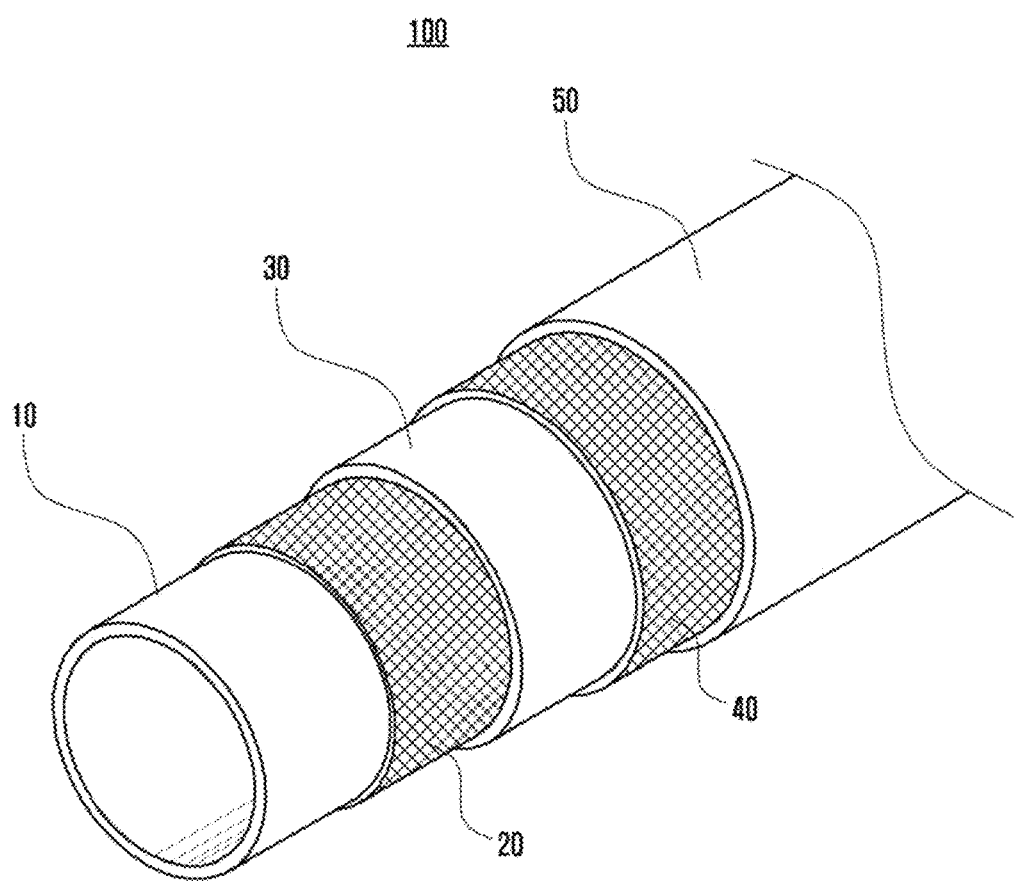
FIG. 1 is a perspective view showing a brake hose according to an embodiment.

FIG. 1 shows an embodiment of a brake hose according to the disclosure.

As shown in the figure, a brake hose 100 according to the disclosure includes: a tube-shaped inner rubber layer 10 filled with a brake fluid; and a first reinforcing fiber layer 20, an intermediate layer 30, a second reinforcing fiber layer 40, and an outer rubber layer 50, which sequentially surround an outer circumferential surface of the inner rubber layer 10.

A polyethylene-2,6-naphthalate fiber (hereinafter, referred to as PET) may be used as a reinforcing fiber material constituting the first reinforcing fiber layer 20 according to the feature of the disclosure. Therefore, all of fatigue resistance, corrosion resistance (brake fluid resistance), and expansion resistance can be implemented at high levels.

Since the polyethylene-2,6-naphthalate fiber has a naphthalene ring, the molecules of polyethylene-2,6-naphthalate are more rigid than those of polyethylene terephthalate, and thus the polyethylene-2,6-naphthalate fiber has characteristics, such as polymeric and low-elasticity characteristics. Moreover, it is known that the polyethylene-2,6-naphthalate fiber has excellent heat resistance with respect to a small difference in density between a crystalline portion and a non-crystalline portion. Therefore, by using a polyethylene-2,6-naphthalate fiber having these characteristics as a reinforcing fiber material constituting the first reinforcing fiber layer 20, both expansion resistance and corrosion resistance equal to or higher than those of conventional polyvinyl alcohol fibers or that kind of other fibers can be obtained. Furthermore, the polyethylene-2,6-naphthalate fiber does not have a risk of deterioration compared with a particular kind of brake fluid or a kind of fiber different from a polyvinyl alcohol fiber, and thus the polyethylene-2,6-naphthalate fiber can attain excellent corrosion resistance equal to or higher than that of the polyethylene terephthalate fiber, the use of which has been discussed, and furthermore, the polyethylene-2,6-naphthalate fiber can transmit instantaneously the brake pressure while having superior expansion resistance to that of the polyethylene terephthalate fiber, thereby drastically improving response characteristics and brake filling at the time of braking.

The fiber amount and beating condition of the first reinforcing fiber layers 20 are not particularly limited, but it is preferable that the first reinforcing fiber layer 20 has a heat shrinkage of 0.5-8.5% at 150° C., a tensile strength of 6.5 g or more per unit denier, and an elongation of 5% or less at 4.5 g per unit denier load as a polyethylene-2,6-naphthalate fiber. That is, a heat shrinkage of less than 0.5% at 150° C. results in an insufficient effect in the reduction of the amount of volume expansion, and whereas a heat shrinkage of 8.5% or more results in serious deterioration of operating characteristics, for example, an operation of pulling out a mandrel being difficult. Therefore, the heat shrinkage is preferably 2-6%. In addition, a tensile strength of less than 6.5 g per unit denier fails to obtain sufficient rupture strength, and therefore the tensile strength per unit denier is preferably 8.0 kg or more.

In addition, an elongation of 5% or more at 4.5 g per unit denier load results in an insufficient effect in the reduction of the amount of volume expansion, and therefore, the elongation at 4.5 g per unit denier load is preferably 3.5% or less.

In the first reinforcing fiber layer 20 according to the feature of the disclosure, a plurality of layers of butyl rubber as a material having a high loss factor are stacked on the above-described PET fiber to improve vibration insulating performance.

Figure 2:
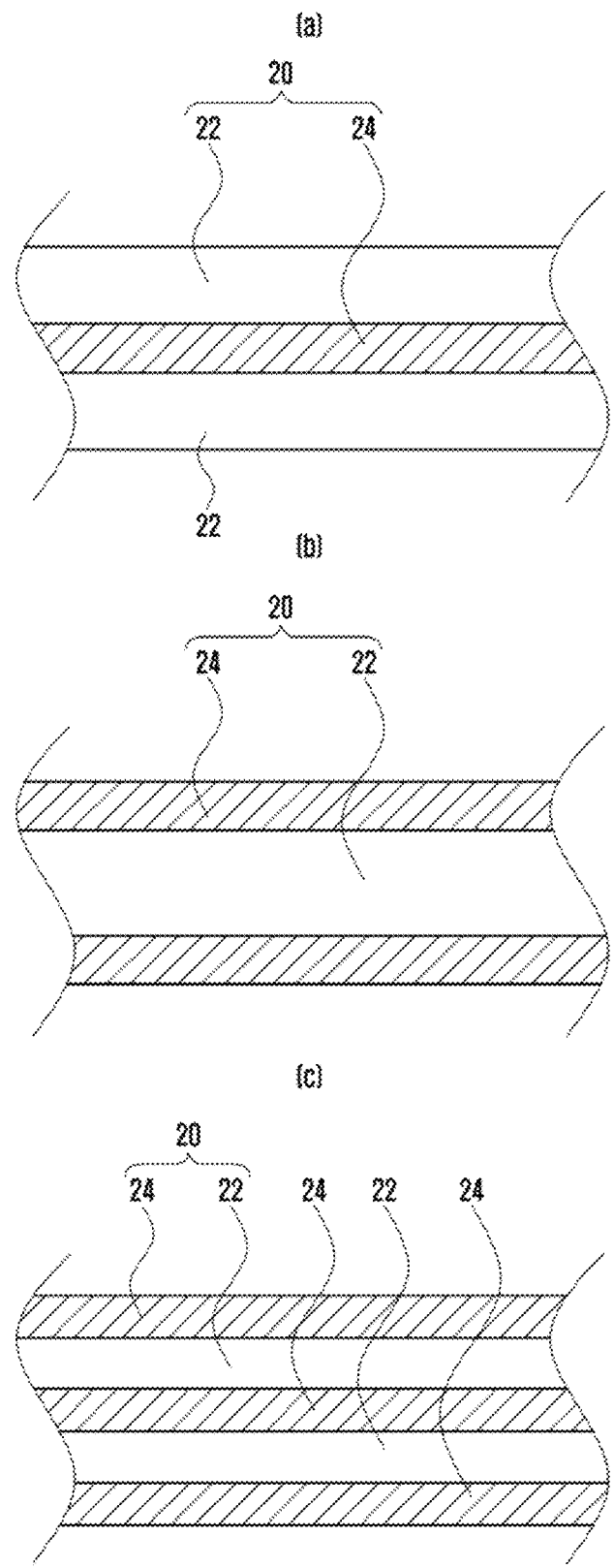
FIG. 2 is a schematic view showing a detailed structure of a first reinforcing fiber layer in FIG. 1.

Referring to FIG. 2, for example, a butyl rubber 24 may be embedded inside the PET fiber 22 (as shown in FIG. 2a), a butyl rubber 24 may be stacked either above or below the PET fiber, butyl rubbers 24 may be attached both above and below the PET fiber 22 (as shown in FIG. 2b), or unlike, butyl rubbers 24 may be stacked above, in the middle of, and below the PET fiber 22 (as shown in FIG. 2c).

According to an embodiment, a butyl rubber, when being stacked, does not facilitate the attachment with an engineering plastic nylon resin (PA6). Therefore, halogenated butyl rubber as a butyl rubber may be employed for productization. The attachment with PA6 is important since the attachment is associated with the airtightness of the brake hose.

The halogenated butyl rubber may have a structure of:

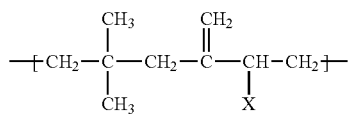

X = Cl, Br wherein a compound of the halogenated butyl rubber contains a base polymer, a reinforcing agent (carbon black), a plasticizer, and a cross-linking agent. A change in loss factor of the rubber was measured by changing the types of respective compounding agents and through variation tests.

As a result of the tests, the composition of compounding agents, which shows the best loss factor while satisfying the performance of a brake hose material, is shown in Table 1.

TABLE 1

| Classification | Invented Product |
| --- | --- |
| Base polymer | 45~50% |
| Reinforcing agent | 25~30% |

TABLE 1-continued

| Classification | Invented Product |
| --- | --- |
| Filler | 9~10% |
| Activating agent | 2~3% |
| Cross-linking agent | 4~5% |
| Process aid | 6~7% |
| TOTAL | 100% |

The main emphasis of the compounding design is that variation transition is blocked by increasing the softening and loss factor of the compounded rubber, and to achieve this, the content of the base polymer was increased by 10 wt % compared with an existing content. In addition, in order to lower the hardness of the rubber and increase the loss factor of the rubber, the carbon black reinforcing agent was employed by mixing FEF (size: 50 nm)/SRF (size: 70 nm) type carbon blacks at a ratio of 1:1 from current mixing of FEF (size: 50 nm)/HAF (size: 30 nm). It could be seen from the dynamic mechanical analysis (DMA) measurement results that the loss factor was increased when carbon black having a larger particle size rather than a smaller particle size was employed.

In a typical viscoelastic polymer, the modulus of storage means the energy stored in a sample (elastic behavior) and the modulus of loss means the lost energy (viscous behavior).

Therefore, the periodic application of external force to a sample results in periodic stress, causing deformation. The mechanical modulus is determined by stress and deformation at that time. In addition, energy loss (damping) due to viscosity and heat of a sample can be obtained through phase retardation or phase lag (δ) occurring from the periodically applied force and the deformation of the sample.

Therefore, the loss factor is a ratio of the modulus of loss and the modulus of storage, indicating the energy lost due to molecular rearrangement or internal friction. The vibration energy is converted into the thermal energy, showing insulation (damping) characteristics. Therefore, a higher loss factor means a higher insulation (damping) effect.

Figure 3:
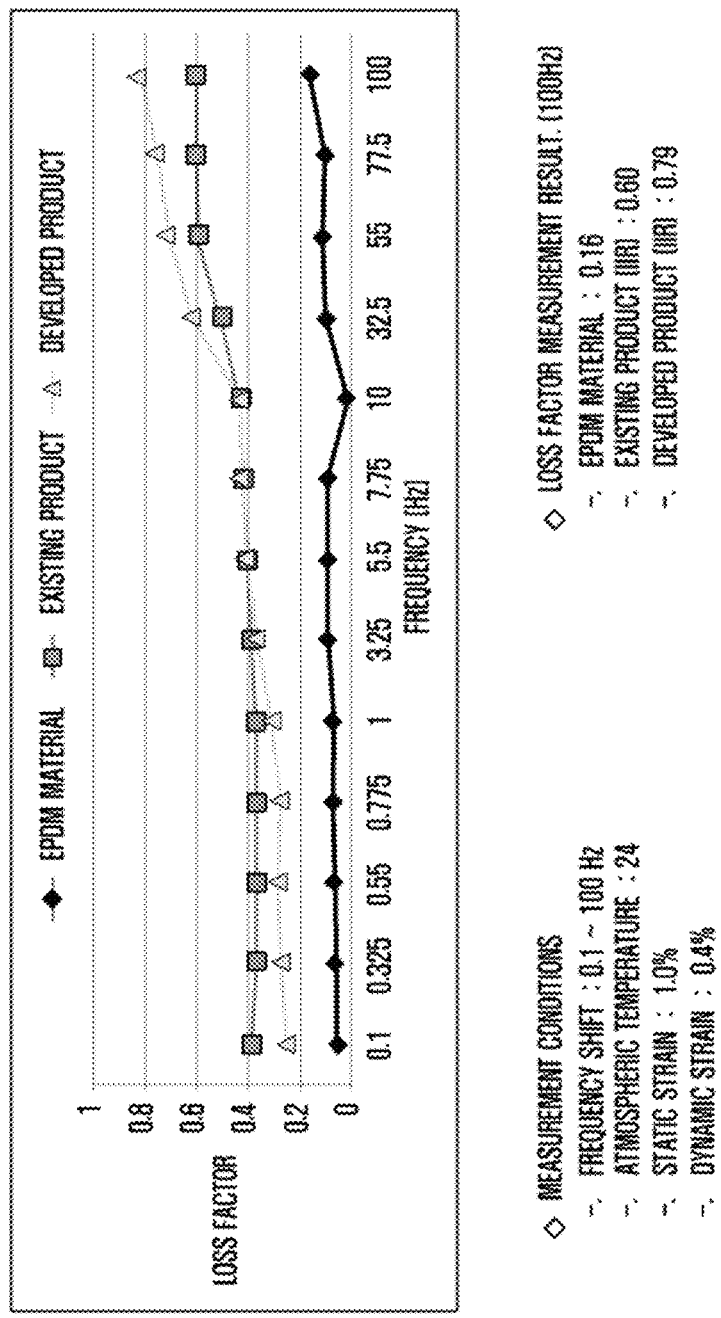
FIG. 3 is a graph showing loss factor test results (DMA).

FIG. 3 is a graph showing DMA measurement results. As can be seen from FIG. 3, the loss factor of a brake hose implemented by the disclosure was 0.79, considerably higher than 0.16, which is the loss factor for a conventional EPDM, and 0.6, which is the loss factor for only an existing butyl rubber (IIR), and as a result of noise evaluation, the brake hose had an excellent noise insulation (damping) effect.

The brake hose may optionally contain a plasticizer in addition to a filler, and the contents of the filler and the plasticizer were adjusted so as not to affect extrudability and kneadabilty, allowing the content of the polymer to be increased.

Although the hardness is slightly lowered by changing the compounding agents, but a hardness of 65 Hs, a tensile strength of 115 Kgf/cm², and an elongation of 404% were maintained without great changes in the other physical properties.

In an embodiment, the inner rubber layer 10, the intermediate rubber layer 30, and the outer rubber layer 50 may be formed by selecting various types of rubber according to requirement characteristics of the brake hose 100. Specifically, the inner rubber layer 10, the intermediate rubber layer 30, or the outer rubber layer 50 may be formed of at least one selected from the group consisting of ethylene propylene diene rubber (EPDM), natural rubber (NR), chloroprene rubber (CR), styrene butadiene rubber (SBR), isobutylene rubber (IIR), chloro sulphonated polyethylene (CSM), and chlorinated polyethylene (CM).

For processing and curing of the inner rubber layer 10, the intermediate rubber layer 30, and the outer rubber layer 50 using the exemplified types of rubber, all the methods that are currently in use can be employed. In addition, the inner rubber layer 10, the intermediate rubber layer 30, and the outer rubber layer 50 may be formed by employing an additive, such as a filler, a reinforcing agent, a processing aid, an antioxidant, or a plasticizer, to the rubber according to requirement characteristics of the brake hose 100.

The second reinforcing fiber layer 40 may be formed by selecting various fibers according to requirement characteristics of the brake hose. Specifically, a synthetic fiber, such as polyvinyl alcohol (PVA) fiber, polyethyleneterephthalate (PET) fiber, polyethylene-2,6-naphthalate fiber, polybutylene terephthalate (PBT) fiber, polyethylene (PE) fiber, polypropylene (PP) fiber, polyvinyl chloride (PVC) fiber, polyurethane fiber, polyimide fiber, or nylon fiber, rayon, a lyocell fiber, or a natural fiber, such as cotton or hemp, may be used.

When the brake hose includes a plurality of reinforcing fiber layers, such as the first reinforcing fiber layer 20 and the second reinforcing fiber layer 40, the first reinforcing fiber layer 20 may be formed by using a PET fiber and the second reinforcing fiber layer 40 may be formed by employing other fibers in addition to the PET fiber. The reason is that the effect of the second reinforcing fiber layer 40 on the amount of expansion is not great compared with the first reinforcing fiber layer 20, and the second reinforcing fiber layer 40 serves to aid the first reinforcing fiber layer 20.

The amount of expansion of the brake hose needs to be small in order to transmit the hydraulic pressure by the brake fluid filling the brake hose 100 directly to wheels to generate braking force. Such an amount of expansion is influenced not only by the characteristics of the first reinforcing fiber layer but also by adhesive strength between the first and second reinforcing fiber layers 20 and 40 and the inner, intermediate, and outer rubber layers 10, 30 and 50.

That is, as for the pressure occurring only when predetermined adhesive strength is maintained between the first and second reinforcing fiber layers 20 and 40 and the inner, intermediate, and outer rubber layers 10, 30, and 50, the first and second reinforcing fiber layers 20 and 40 are integrated with the rubber layers 10, 30, and 50 to increase the resistance to expansion.

Therefore, for maintenance and increase of adhesive strength between the first and second reinforcing fiber layers 20 and 40 and the rubber layers 10, 20, and 50, the first or second reinforcing fiber layer may be immersed in an immersion liquid. For example, the inner rubber layer 10, on which the first reinforcing fiber layer 20 is knitted is immersed in an immersion liquid, so the immersion liquid can infiltrate into the PET fiber of the first reinforcing fiber layer 20.

A suitable immersion liquid according to the rubber materials constituting the rubber layers 10, 30, and 50 may be used. The immersion liquid is formed by mixing resorcinol, formaldehyde, and latex, and the adhesive strength can be controlled by adjusting respective contents of the resorcinol, formaldehyde, and latex and the kind of latex according to the rubber materials of the rubber layers 10, 30, and 50 and the types of the first and second reinforcing fiber layers 20 and 40.

A fiber, which is hardly attached due to a molecular structure thereof, like a polyester fiber, is used together with a primer and an immersion liquid, thereby enhancing adhesive strength between the second reinforcing fiber layer 40 and the intermediate rubber layer 30 and between the second reinforcing fiber layer 40 and the outer rubber layer 50.

Furthermore, the adhesive strength between the first and second reinforcing fiber layers 20 and 40 and the inner and intermediate rubber layers 10 and 30 can be enhanced by treating an adhesive agent on each of outer circumferential surfaces of the inner and intermediate layers 10 and 30 before knitting of the first and second reinforcing fiber layers 20 and 40.

The adhesive strength required between the first and second reinforcing fiber layers 20 and 40 and the rubber layers 10, 30, and 50 would depends on the characteristics of the brake hose, but may be preferably 2 N/cm or more.

Since the brake hose according to an embodiment includes a first reinforcing fiber layer 20 formed by stacking butyl rubber on the PET fiber, expansion resistance at room temperature and a high temperature can be improved and solvent resistance and fatigue resistance can be improved. Therefore, a brake hose having excellent braking force at both room temperature and a high temperature can be provided, and the vibration insulating performance is improved since a plurality of layers of butyl rubber having a high loss factor are stacked on the PET fiber.

The embodiment has been described with respect to the brake hose 100 including the inner rubber layer 10, the first reinforcing fiber layer 20, the intermediate rubber layer 30, the second reinforcing fiber layer 40, and the outer rubber layer 50, but a brake hose not including the intermediate rubber layer 30 or the intermediate rubber layer 30 and the second reinforcing fiber layer 40 according to the requirement characteristics of the brake hose is also possible.

An exemplary method for manufacturing a bake hose according to an embodiment is as follows.

Initially, a tube-shaped inner rubber layer is molded by an extrusion molded machine, and a long mandrel is inserted into a hole of the inner rubber layer. Thereafter, a first reinforcing fiber layer is knitted using a PET fiber on an outer circumferential surface of the inner rubber layer, wherein butyl rubber is embedded inside the PET fiber, butyl rubber is attached above and below the PET fiber, or butyl rubber is stacked inside and above and below the PET fiber.

Then, an intermediate rubber layer is formed on an outer circumferential surface of the first reinforcing fiber layer through extrusion using an extruder or by winding a long rubber tape. In the case in which the rubber tape is wound, a second reinforcing fiber layer may be knitted on the rubber tape while the rubber tape is wound. For enhancement of adhesive strength between the first and second reinforcing fiber layers and the rubber layers formed therearound, the first and second reinforcing fiber layers are immersed in an immersion liquid and then dried, or as needed, a procedure of coating an adhesive agent may be further carried out.

After the formation of the second reinforcing fiber layer, an outer rubber layer is extrusion molded on an outer circumference of the second reinforcing fiber layer. The hose thus manufactured is vulcanized together with the mandrel, and after the vulcanization, the mandrel is taken out using hydraulic pressure, and then the hose is cut into a predetermined length before use.

The brake hoses 100 according to various embodiments configured as above sufficiently satisfy excellent expansion resistance, fatigue resistance, and corrosion resistance while having improved vibration and noise insulating performance, by allowing the first reinforcing fiber layer to have a stacked structure of PET and a plurality of layers of butyl rubber to increase the softening and loss factor of the compounded rubber. Furthermore, the brake hoses according to various embodiments can be produced without separate equipment investment since the first reinforcing fiber layer can be formed in a stacked structure of PET and a plurality of layers of butyl rubber even using only the current production equipment, thereby reducing manufacturing costs.

As set forth above, the disclosure has been described by way of embodiments, but is not limited thereto, and any modification and change can be made within the scope of technical spirit of the disclosure.

What is claimed is:

1. A brake hose comprising:
   a tube-shaped inner rubber layer filled with a brake fluid; and
   a first reinforcing fiber layer, an intermediate rubber layer, a second reinforcing layer, and an outer rubber layer, which sequentially surround an outer circumferential surface of the inner rubber layer,
   wherein the first reinforcing fiber layer has a structure in which a plurality of layers of butyl rubber, which is a material having a high loss factor, are stacked on a PET fiber to improve vibration insulating performance.

2. The brake hose of claim 1, wherein the PET fiber is a polyethylene-2,6-naphthalate fiber.

3. The brake hose of claim 1, wherein the butyl rubber is a halogenated butyl rubber, and wherein the butyl rubber is embedded inside the PET fiber, or the butyl rubber is attached either or both above or below the PET fiber, or the butyl rubber is stacked above, inside, and below the PTE fiber.

4. The brake hose of claim 3, wherein the halogenated butyl rubber has a structure of:

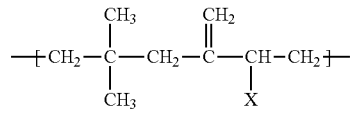

X = Cl, Br wherein a compound of the halogenated butyl rubber comprises a base polymer, a reinforcing agent (carbon black), a plasticizer, and a cross-linking agent.

5. The brake hose of claim 4, wherein the content of the base polymer increases by 10 wt % on the basis of an existing content thereof, and
   wherein in order to lower the hardness of the butyl rubber and increase the loss factor of the butyl rubber, the carbon black reinforcing agent employs FEF (size: 50 nm)/SRF (size: 70 nm) type carbon blacks mixed at a ratio of 1:1.

* * * * *